United States Patent Office 2,953,386
Patented Sept. 20, 1960

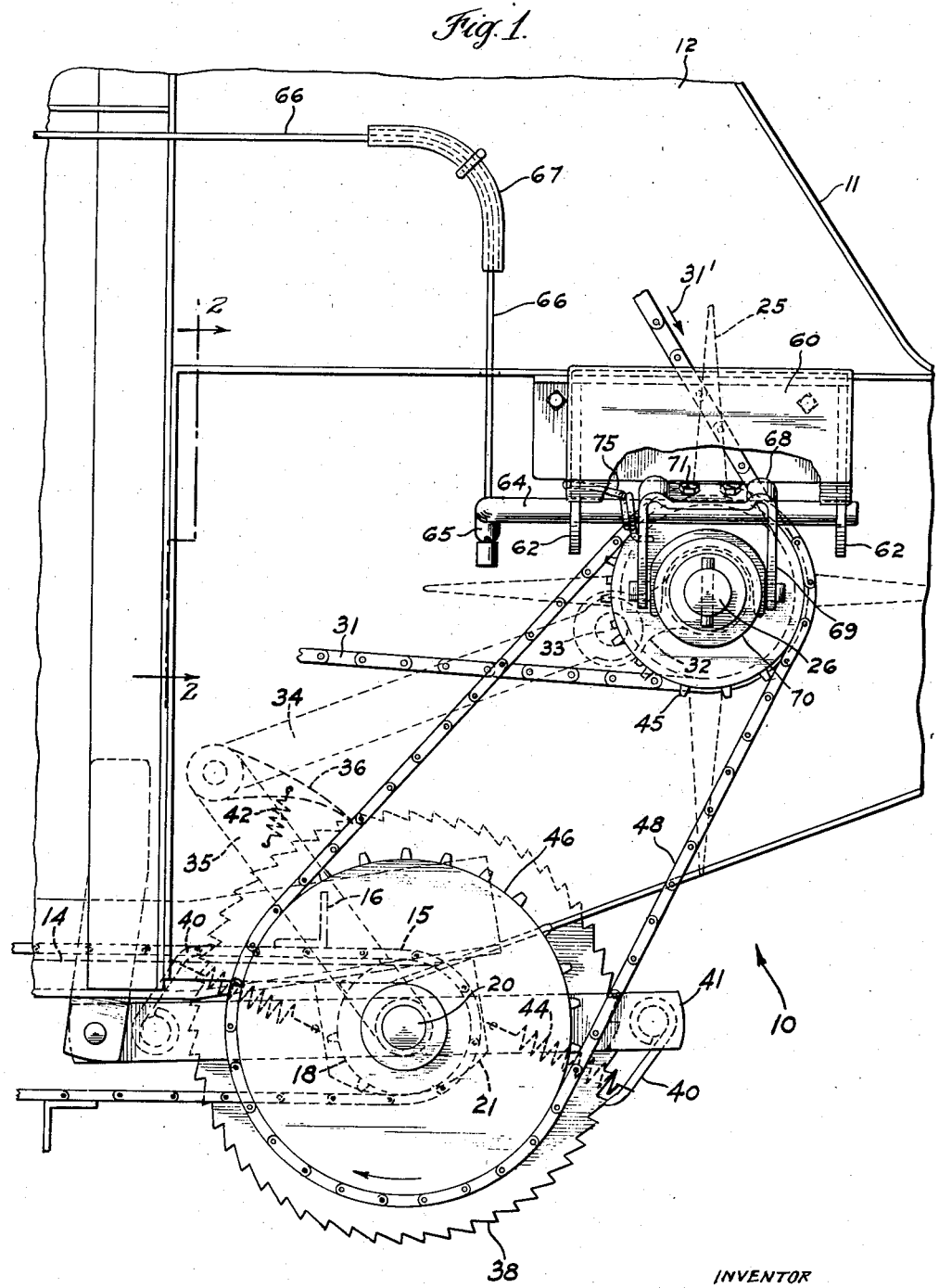

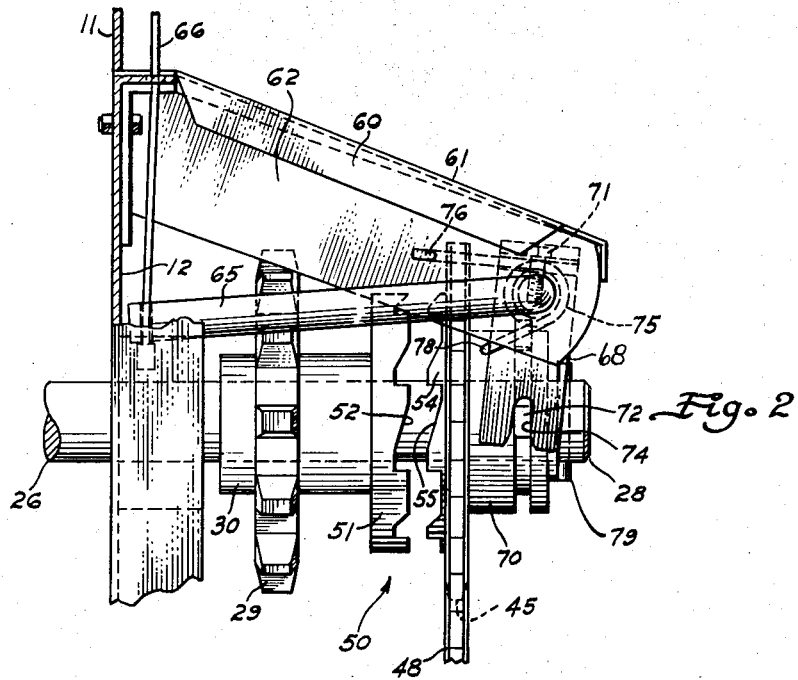
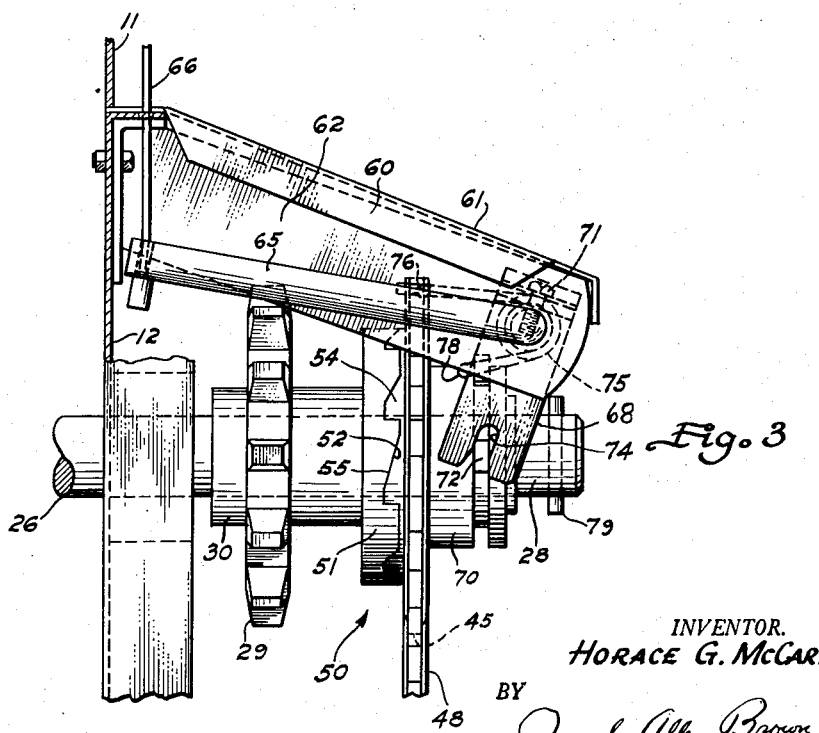

2,953,386

RAPID CLEANOUT FOR MANURE SPREADER

Horace G. McCarty, New Holland, Pa., assignor to Sperry Rand Corporation, New Holland, Pa., a corporation of Delaware Filed Mar. 12, 1958, Ser. No. 720,895

6 Claims. (Cl. 275—6)

The present invention relates generally to manure spreaders. More particularly, the invention relates to improved means for unloading a manure spreader wagon, particularly the last portion of a load.

A conventional manure spreader has a longitudinal body adapted to be heaped high with manure. The body has a discharge end across which rotatable beaters extend. An apron movable over the floor of the body is operable to deliver the manure, more or less en masse, toward the discharge end and into the beaters which serve to break up the manure as it leaves the body and spread it in an even pattern over the field. No particular difficulty is encountered in unloading the major portion of the load. However, when the load gets down to a last few bushels, considerable trouble is encountered in getting such last portion out of the spreader. Lumps of material left on the spreader floor tend to tumble over the slats of the slowly moving feed apron rather than move with it and be discharged. Moreover, when such lumps reach the discharge end of the spreader body, the beaters tend to kick the lumps back into the body and impede discharge. Therefore, it is common in many spreaders presently being sold, to have means whereby at the end of a load the beaters may be stopped while the apron is left in operation. Material unloaded while the beaters are stopped falls through the beater teeth and to the ground in an irregular, lumpy pattern which on new seeding, and for other reasons, is quite objectionable.

Further, when the load gets near the end, the busy farm operator is unable to spend an undue amount of time waiting for the slowly moving apron to get every last lump of material out of the spreader. Thus, he often leaves the field with some small amount of material still in the spreader. If the spreader is then parked outdoors in freezing weather, and if it has not been thoroughly cleaned out manually, the material left behind will often freeze solid to the spreader floor. Broken chains, bent apron slats and the like may result when the spreader is subsequently used.

The improvement provided by this invention works in conjunction with the usual ratcheting type apron drive mechanism used on manure spreaders. The major portion of the load is unloaded normally as before. However, when the load has been reduced to a few bushels, the device of this invention has as its primary object to provide means whereby the operator, without leaving the tractor seat, may quickly, completely and effectively clean out the last few bushels.

Another object of this invention is to provide a device of the character described which is of simple construction and thus inexpensive to manufacture.

Other objects of this invention will be apparent hereinafter from the specification and from the recital in the appended claims.

In the drawings:

Fig. 1 is a fragmentary side elevation of the discharge end of a manure spreader having a device constructed according to this invention for unloading the spreader and distributing the load;

Fig. 2 is an enlarged fragmentary section taken on the line 2—2 of Fig. 1, looking in the direction of the arrows, and showing the clutching means of the device in normal disengaged position; and Fig. 3 is a view similar to Fig. 2 showing the clutching means engaged.

With applicant's device, a drive is provided to the main beater drive shaft to rotate the beater. A first drive in the form of a ratchet mechanism is provided between the main beater shaft and the shaft from which the feed apron is normally operated. A second, normally disengaged, drive is also provided between the main beater shaft and the apron shaft, which when engaged greatly speeds up the apron shaft, such as ten times its ordinary slow speed to thereby produce a rapid clean out of the spreader.

Referring now to the drawings by numerals of reference, and particularly to Fig. 1, 10 denotes the discharge end of a manure spreader wagon. The wagon has a body 11 having a pair of opposed side walls, one of which is shown at 12, aand a floor 14. The wagon body is supported for field travel on a suitable wheeled frame, not shown, of conventional construction. Movable over floor 14 to convey manure in the spreader toward the right of Fig. 1, is an endless feed apron having transverse slats 16 for pushing the manure and moving it toward the rear end of the wagon. Apron 15 extends around pairs of relatively spaced sprockets at the front and rear end of the wagon body. The rear pair of sprockets 18 are carried on a shaft 20 journalled at its ends in depending brackets 21 affixed to the wagon body.

Spaced vertically of apron 15 and disposed rearwardly thereof is a main beater 25 carried on and connected to a drive shaft 26 supported at its ends in the side walls of body 11. When looking from left to right in Fig. 1, the main beater shaft has an outwardly projecting right hand portion 28 (Figs. 2 and 3) on which a drive sprocket 29 is mounted. Sprocket 29 has a hub 30 which may be keyed or otherwise affixed to the main beater drive shaft. Extending around the drive sprocket is a chain 31 driven in the direction of the arrow 31′ (Fig. 1) from a source of power not shown. Such drive may be through a conventional power-take-off connection between the spreader and the tractor for towing it, whereby the spreader uses tractor power for operating its unloading mechanism; or, the mechanism may be ground driven.

The end of shaft 26 opposite end 28, or the lefthand end when viewed from front to rear, has a radial arm 32 (Fig. 1) connected to it. Arm 32 carries an outwardly projecting pin 33 which extends on an axis parallel to the axis of shaft 26 and is eccentric thereto. Universally connected to pin 33 is one end of a reciprocable connecting rod 34. The opposite end of the connecting rod is pivotally fastened to the outer end of a radial arm 35 pivotal about the axis of apron shaft 20. Suitably supported at the pivotal connection between 34 and 35 is a driving pawl 36. Pawl 36 engages the toothed periphery of a ratchet wheel 38 connected to apron shaft 20. The driving connection between the main beater shaft 26 and the apron shaft 20 through the pawl and ratchet wheel is such that the apron shaft rotates at a much slower speed than the main beater shaft. Suitable means, not shown, of conventional construction may be provided for varying the "throw" of pawl 36 whereby with each reciprocation of the connecting rod 34 the pawl moves the ratchet wheel a distance of from one to four or more teeth. To prevent apron 15 from being driven in reverse, holding pawls 40 are provided. These holding pawls are carried on a support arm 41 suitably connected to shaft 20. Driving pawl 36 is biased against the periphery of ratchet wheel 38 by a spring 42. The holding pawls are similarly biased by springs 44.

The exact difference in speed of rotation between the main beater shaft and apron shaft is of no consequence to the present invention. In one spreader application the main beater is rotated at 195 r.p.m.'s while the apron is rotated at speeds ranging from 3.25 to 13 r.p.m.'s depending upon the drive setting provided. Other suitable speed differentials could be employed. Further, it should be noted that while the holding pawls prevent the ratchet wheel from rotating in reverse, there is nothing stopping the ratchet wheel from overrunning in a forward direction. This pawl and ratchet drive, between the main beater shaft and apron shaft comprises a first driving connection between the parts.

In addition to such first drive, there is a second, normally disengaged, drive between the main beater shaft and the apron shaft. This is provided by sprockets 45 and 46 and endless chain 48 connecting them. Sprocket 45 is freely rotatable on the projecting outer end 28 of the beater shaft 26 and is axially slidable thereon. Sprocket 46 is keyed or otherwise fastened to apron shaft for rotation therewith. When apron 15 is being driven by the first drive means, sprocket 46 will rotate with the apron shaft and thereby "idle" endless chain 48 and the sprocket 45 on the main beater shaft.

To provide means whereby the second drive may be established between the main beater shaft and the apron shaft, a jaw clutch arrangement 50 is provided. The outer axial end of hub 30 of drive sprocket 29 carries a clutch element 51 having a toothed side face 52. The sprocket 45 has a clutch element 54 providing a clutch face 55 cooperative and engageable with the clutch face 52. Sprocket 45 is normally disposed as shown in Fig. 2, axially spaced from clutch element 51 where it may freely rotate on end 28 of the beater shaft.

Connected to the wagon body and overlying sprocket 45 is a support bracket 60 having a top wall 61 and relatively spaced side walls 62. Pivotally supported on walls 62 is a fore and aft extending control rod 64 having an actuating handle 65 to which one end of a flexible cable 66 is connected. Cable 66 passes through a series of guides, such as guide 67, to a position at the forward end of the spreader where an operator driving a tractor towing the spreader can readily reach the cable and pull it.

Mounted on control rod 64 is a yoke 68 having legs 69 which straddle the hub 70 of sprocket 45. The control arm extends through legs 69 and the yoke is held against pivotal movement on the arm by lock screws 71. At diametrically opposite sides of hub 70 are radial pins 72 which project through slots 74 in the terminal ends of the yoke legs 69. A spring 75 surrounds the control rod, having one end 76 connected to a bracket 60 and its other end engaging one leg of the yoke to bias the yoke in a counterclockwise direction to the position shown in Fig. 2 wherein the hub 70 of sprocket 45 is held in an axial position against a stop pin 79. Movement of hub 70 to the position shown in Fig. 3 is against the resistance of spring 75.

Operation

The operator of the spreader unloads wagon 11 in the usual manner, the apron 15 being driven through the pawl and ratchet mechanism. The main beater 25 operates at a relatively high speed during the entire unloading operation. Up until the point where there are only a few bushels of material remaining in the spreader, the hub 70 of sprocket 45 is allowed to remain in the position shown in Fig. 2. When the spreader is almost empty, the operator pulls cable 66. This causes the control arm 64 to pivot and the yoke 68 to shift the sprocket 45 axially on shaft 26 toward sprocket 29 and to cause an engagement of the jaw clutch elements 51 and 54. The respective parts move from the position shown in Fig. 2 to the position shown in Fig. 3. Once the jaw clutch is engaged, there is a direct drive from the main beater shaft to apron shaft 20. The rate of movement of the apron is now rapidly increased, for example, ten times its maximum normal rate of speed. Any lumps of material remaining on the wagon floor will be engaged by the slats 16 and rather than merely tumbling over the slats will be contacted with considerable force and broken up whereby the wagon will be completely and thoroughly cleaned out. Moreover, the last portion of the load, as it is discharged, will move against a rotating main beater and rather than falling in an uneven pattern, will be evenly spread.

When the apron is being operated at high speed, the ratchet wheel 38 overruns, the driving and holding pawls merely skipping over the ratchet teeth.

Whereas considerable time was required at the end of an unloading operation to get the wagon bed clean, the cleaning of the last portion of the load from the wagon may now be accomplished in a very short time with this invention. The operator thus loses no valuable time and can get back to the barn for another load of manure or he can take the spreader to a place of storage and begin other tasks on the farm. The structure employed has few parts and is inexpensive to manufacture.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. In a wagon for spreading manure and the like, a body having a floor and a discharge end, an apron movable over said floor toward said discharge end, an apron shaft for moving the apron, a beater rotatably supported on said body and extending across said discharge end, a beater shaft for rotating the beater, power means for driving said beater shaft, a first drive means including a pawl and ratchet connecting said beater shaft to said apron shaft to move said apron, a second drive means connected to said apron shaft and operable to move said apron at a speed substantially faster than the maximum speed obtainable by said first drive means, and means for connecting said second drive means to said beater shaft.

2. In a wagon for spreading manure and the like, a body having a floor and a discharge end, an apron movable over said floor toward said discharge end, an apron shaft for moving the apron, a beater rotatably supported on said body and extending across said discharge end, a beater shaft for rotating the beater, power means for driving said beater shaft, a first drive means including a pawl and ratchet connecting said beater shaft to said apron shaft to move said apron, and a second drive means for connecting said beater shaft to said apron shaft to move said apron at a speed substantially faster than the maximum speed obtainable by said first drive means, said second drive means comprising a first sprocket normally freely rotatable on said beater shaft, a second sprocket affixed to said apron shaft, an endless member connecting said sprockets, and means for connecting said first sprocket to said beater shaft.

3. In a wagon for spreading manure and the like, a body having a floor and a discharge end, an apron movable over said floor toward said discharge end, an apron shaft for moving the apron, a beater rotatably supported on said body and extending across said discharge end, a beater shaft for rotating the beater, power means for driving said beater shaft, a first drive means including a pawl and ratchet connecting said beater shaft to said apron shaft to move said apron, a second drive means for connecting said beater shaft to said apron shaft to move said apron at a speed substantially faster than the maximum speed obtainable by said first drive means, said second drive means comprising a first sprocket normally freely rotatable on said beater shaft, a second sprocket affixed to said apron shaft, and an endless member connecting said sprockets, and means for engaging said second drive means, said engaging means comprising a first clutch element connected to said first sprocket, a second cooperative clutch element affixed to said beater shaft, yieldable means normally holding said first clutch element spaced from said second clutch element along the axis of said beater shaft, and means for sliding said first sprocket axially on said beater shaft to bring about an engagement of the respective clutch elements.

4. In a wagon for spreading manure and the like, a body having a floor and a discharge end, an apron movable over said floor toward said discharge end, an apron shaft for moving the apron, a beater rotatably supported on said body and extending across said discharge end, a beater shaft for rotating said beater, power means for driving said beater shaft, a first drive means including a pawl and ratchet connecting said beater shaft to said apron shaft to move said apron, a second drive means for connecting said beater shaft to said apron shaft for driving the apron shaft at a speed substantially greater than the maximum speed obtainable by said first drive means, said second drive means comprising a first sprocket normally freely rotatable and axially slidable on said beater shaft, a second sprocket affixed to said apron shaft, and an endless chain connecting said sprockets, means for connecting said first sprocket to said beater shaft comprising a first clutch element connected to said first sprocket, a second element affixed to said beater shaft, spring means normally holding said first clutch element normally spaced from said second clutch element, and means for axially sliding said first sprocket to bring about an engagement of the respective clutch elements, said sliding means comprising a bracket affixed to said wagon body, a yoke pivotally supported on said bracket, means connecting said yoke to said first sprocket whereby when the yoke is pivoted the first sprocket is slid, and means for pivoting said yoke.

5. In a wagon for spreading manure and the like, a body having a floor and a discharge end, an apron movable over said floor toward said discharge end, an apron shaft for moving the apron, a beater rotatably supported on said body and extending across said discharge end, a beater shaft for rotating said beater, power means for driving said beater shaft, a first drive means connecting said beater shaft to said apron shaft to move said apron, a second drive means for connecting said beater shaft to said apron shaft for driving said apron shaft at a speed substantially greater than the maximum speed obtainable by said first drive means, said second drive means comprising a first sprocket normally freely rotatable and axially slidable on said beater shaft, a second sprocket affixed to said apron shaft, and an endless chain connecting said sprockets, means for connecting said first sprocket to said beater shaft comprising a first clutch element connected to said first sprocket, a second clutch element affixed to said beater shaft, spring means normally holding said first clutch element spaced from said second clutch element, and means for axially sliding said first sprocket to bring about an engagement of the respective clutch elements, said sliding means comprising a bracket affixed to said wagon body, a yoke pivotally supported on said bracket, said yoke having a pair of legs which straddle a hub portion of said first sprocket, means connecting said legs to said hub portion whereby when said yoke is pivoted the first sprocket is slid, and manually operable means for pivoting said yoke.

6. In a wagon for spreading manure and the like, a body having a floor and a discharge end, an apron movable over said floor toward said discharge end, an apron shaft for moving said apron, a first drive connected to said apron shaft to drive the shaft, said first drive including a pawl and ratchet, a second drive for driving said apron shaft at a speed substantially faster than the maximum speed obtainable by said first drive means, and means for connecting said second drive to said apron shaft.

References Cited in the file of this patent

UNITED STATES PATENTS

| | | |
|---|---|---|
| 1,554,383 | Stamp | Sept. 22, 1925 |
| 2,653,028 | Templeton | Sept. 22, 1953 |
| 2,699,337 | Best | Jan. 11, 1955 |